(12) United States Patent  
Duge et al.

(10) Patent No.: US 9,109,539 B2  
(45) Date of Patent: Aug. 18, 2015

(54) TURBINE BASED COMBINED CYCLE ENGINE

(75) Inventors: Robert T. Duge, Carmel, IN (US); Craig Heathco, Martinsville, IN (US); Brian Paul King, Greenwood, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1236 days.

(21) Appl. No.: 12/978,876

(22) Filed: Dec. 27, 2010

(65) Prior Publication Data

US 2012/0159925 A1  Jun. 28, 2012

(51) Int. Cl.
| | |
|---|---|
| F02K 7/16 | (2006.01) |
| F02K 3/02 | (2006.01) |
| F02K 7/10 | (2006.01) |
| F02K 7/14 | (2006.01) |

(52) U.S. Cl.
CPC ... *F02K 7/16* (2013.01); *F02K 3/02* (2013.01); *F02K 7/10* (2013.01); *F02K 7/14* (2013.01); *F05D 2220/74* (2013.01)

(58) Field of Classification Search
CPC .............. F02K 9/46; F02K 9/48; F02K 7/10; F02K 7/14; F02K 7/16; B64C 2201/046; B64C 2201/048; F05D 220/10; F05D 2220/742

USPC .................... 60/39.23, 226.1, 230, 231, 767; 417/405–407, 409, 360, 373
See application file for complete search history.

(56) References Cited

U.S. PATENT DOCUMENTS

| | | | | |
|---|---|---|---|---|
| 2,955,414 | A | * | 10/1960 | Hausmann ...................... 60/244 |
| 4,782,659 | A | | 11/1988 | Lewis et al. |
| 4,909,031 | A | | 3/1990 | Grieb |
| 4,919,364 | A | | 4/1990 | John et al. |
| 5,058,377 | A | * | 10/1991 | Wildner .......................... 60/224 |
| 5,076,052 | A | | 12/1991 | Wildner |
| 5,094,070 | A | | 3/1992 | Enderle |
| 5,284,014 | A | | 2/1994 | Brossier et al. |
| 5,343,695 | A | | 9/1994 | Pascal et al. |
| 5,347,807 | A | | 9/1994 | Brossier et al. |
| 5,379,583 | A | * | 1/1995 | Zickwolf, Jr. ................... 60/794 |
| 5,586,735 | A | | 12/1996 | Falempin et al. |
| 5,694,768 | A | | 12/1997 | Johnson et al. |
| 7,168,236 | B2 | | 1/2007 | Schmotolocha et al. |
| 7,216,474 | B2 | | 5/2007 | Bulman et al. |
| 2005/0081509 | A1 | * | 4/2005 | Johnson ....................... 60/226.1 |

* cited by examiner

*Primary Examiner* — Phutthiwat Wongwian  
*Assistant Examiner* — Marc Amar  
(74) *Attorney, Agent, or Firm* — Krieg Devault LLP

(57) ABSTRACT

An aircraft powerplant is disclosed that can be operated in at least three modes including as a gas turbine engine, as an engine having a ramburner, and as an engine having a forward compression combustor engine such as a ramjet and/or scramjet. An airflow valve is provided to direct air to a downstream portion of the aircraft engine and can be positioned as a function of the aircraft operating modes. The valve can be used to cocoon the gas turbine engine.

14 Claims, 4 Drawing Sheets

TURBINE BASED COMBINED CYCLE ENGINE

FIELD OF THE INVENTION

The present invention generally relates to aircraft engines, and more particularly, but not exclusively, to aircraft engines having turbine based combined cycles.

BACKGROUND

Operating aircraft engines over a wide speed range remains an area of interest. Some existing systems have various shortcomings relative to certain applications. Accordingly, there remains a need for further contributions in this area of technology.

SUMMARY

One embodiment of the present invention is a unique aircraft engine. Other embodiments include apparatuses, systems, devices, hardware, methods, and combinations for aircraft engines having combined cycles. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
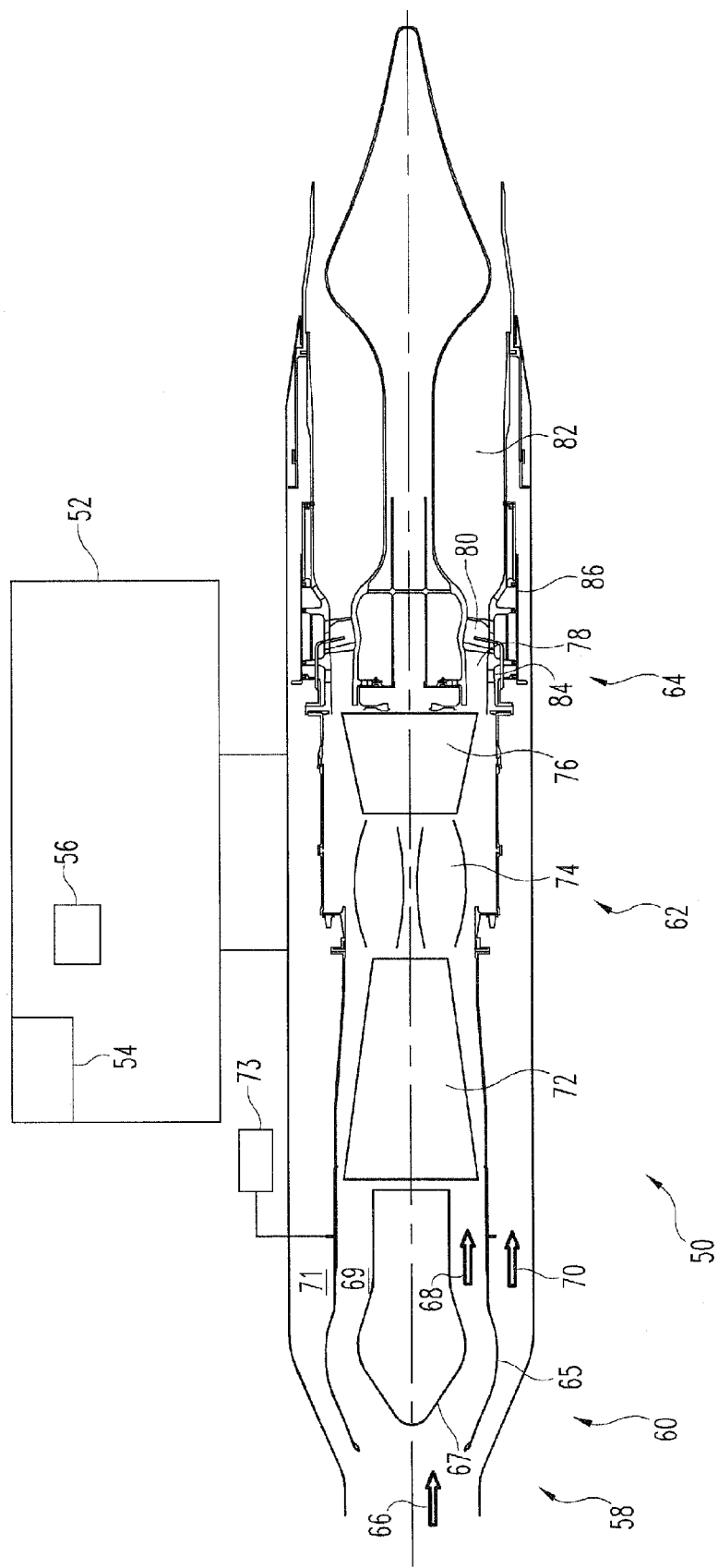
FIG. 1 illustrates one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of an aircraft engine 50 used as a powerplant for an aircraft 52. As used herein, the term "aircraft" includes, but is not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as, for example, industrial applications, power generation, pumping sets, naval propulsion and other applications known to one of ordinary skill in the art. The aircraft 52 may operate at a variety of speeds and includes a sensor 54 and a controller 56.

The sensor 54 measures aircraft flight condition such as speed and altitude, to set forth just two non-limiting examples, and may output any variety of data whether sensed or calculated. For example, the sensor 54 may sense and output conditions such as static temperature, static pressure, total temperature, and/or total pressure, among possible others. In addition, the flight condition sensor 54 may output calculated values such as, but not limited to, equivalent airspeed, altitude, and Mach number. Any number of other sensed conditions or calculated values may also be output. The flight condition sensor 54 provides data to the controller 56 and may output values in either analog or digital form.

The controller 56 is typically positioned in an avionics bay and can be a single component, or a collection of operatively coupled components. The controller 56 can be comprised of digital circuitry, analog circuitry, or a hybrid combination of both of these types. Also, the controller 56 can be programmable, an integrated state machine, or a hybrid combination thereof. The controller 56 may include one or more Arithmetic Logic Units (ALUs), Central Processing Units (CPUs), memories, limiters, conditioners, filters, format converters, or the like which are not shown to preserve clarity. In one form, the controller 56 is of a programmable variety that executes algorithms and processes data in accordance with operating logic that is defined by programming instructions (such as software or firmware). Alternatively or additionally, operating logic for the controller 56 can be at least partially defined by hardwired logic or other hardware. In one particular form, the controller 56 is configured to operate as a Full Authority Digital Engine Control (FADEC); however, in other embodiments it may be organized/configured in a different manner as would occur to those skilled in the art. It should be appreciated that the controller 56 can be exclusively dedicated to control of the aircraft engine 50, or can further be used in the regulation/control/activation of one or more other subsystems or aspects of the aircraft 52 or the aircraft engine 50.

The aircraft engine 50 includes an inlet 58, an inlet valve 60, a gas turbine engine 62, and a combustion device 64. The inlet 58 captures air for use by the aircraft engine 50. In some forms the inlet 58 is sized for low speed and lower altitude flight conditions, which can then result in the inlet 58 being over designed for operation in an upper right hand corner of an engine operating envelope. An over-designed inlet can produce additional, unneeded mass flow. The inlet 58 can be annular in shape or can take on any variety of other shapes or forms. In some embodiments the inlet 58 can be incorporated solely in the aircraft engine 50, or can be integrated with an airframe of the aircraft 52. The inlet 58 can incorporate any number of movable mechanisms to modulate/vary the amount of airflow received by the aircraft engine 50, and/or to provide a compression and/or expansion of an airflow received by the aircraft engine 50. Such movable mechanisms can also be incorporated into the airframe of the aircraft 52.

The inlet valve 60 is used to split/redirect/partition an inlet airflow 66 between a core flow 68 and a bypass flow 70. The inlet valve 60 can take the form of any device that is moved to modulate/meter/control the flow of air into the propulsion engine. In one form the inlet valve 60 includes a valve member 65 and a centerbody 67. The valve member 65 and the centerbody 67 couple with each other to open and close air flow passages, such as, but not limited to, a core passage 69 and bypass passage 71. In one form the valve member 65 can be translated fore and aft while the centerbody 67 remains stationary, but in other forms the valve member 65 can be pivoted, rotated, translated or actuated in any variety of other ways. In some forms the centerbody 67 can alternatively and/or additionally be moved. The valve member 65 can be an annular shaped body and can be a unitary piece or can be segmented. In addition, the centerbody 67 can be a unitary piece or can be segmented. A position of the inlet valve 60 can be set/varied/commanded by the controller 56 which can be the result of a change in flight condition, among other possible conditions/events/modes. In one form the valve member 65 can be actuated by a single actuation device 73, or a plurality of actuation devices 73. The actuation device or devices 73 can be electric, hydraulic, and/or pneumatic, to set forth just a few non-limiting examples.

The gas turbine engine 62 includes a compressor 72, a core combustor 74, and a turbine 76. In some forms the gas turbine engine 62 can include additional compressor and/or turbine sections coupled though separate pressure spools. To set forth just two non-limiting examples, the gas turbine engine 62 may include a high pressure compressor and a low pressure compressor. The terms "low pressure" and "high pressure" are used for convenience herein to denote a relative difference in pressure between the sections and is not intended to imply a low absolute pressure or high absolute pressure.

The gas turbine engine 62 can take on a variety of forms in other embodiments. For example, in some forms the gas turbine engine 62 can be operated as an adaptive or variable cycle engine. Furthermore, the gas turbine engine 62 can incorporate combustors such as pulse detonation combustors, wave rotor combustors, and others, to set forth just a few non-limiting examples. Yet further, the rotating turbomachinery such as the compressor 72 and turbine 76 may incorporate active tip clearance control. These and other forms of the gas turbine engine 62 are contemplated herein.

The core flow 68 enters the core passage 69 of the gas turbine engine 62 and is compressed by the compressor 72 before being mixed with fuel and burned in the core combustor 74. The products of combustion from the core combustor 74 form a combustion flow stream which enters the turbine 76. The turbine 76 extracts useful work from the combustion flow stream to drive various components of the gas turbine engine 62 and/or the aircraft 52. Upon exiting the turbine 76 the combustion flow stream enters the combustion device 64.

In one form the combustion device 64 includes an upstream chamber 78, a downstream chamber 82, and a fuel injector 80. The combustion device 64 can be operated to pass through a combustion flow stream from an upstream gas turbine engine, it can be operated to form part of a ramburner combustor, and it can be operated as part of a forward speed compression combustion device, to set forth just three non-limiting examples. The forward speed compression combustion device may take the form of a ramjet, scramjet, or any other type of combustor that receives a compressed airflow provided by the forward speed or the vehicle and not necessarily by a rotary compressor mechanism. The upstream chamber 78 receives the combustion flow stream from the gas turbine engine 62, and can alternatively and/or additionally receive at least part of the bypass flow 70. The upstream chamber 78 can include an upstream chamber valve 84 that can selectively admit at least part of the bypass flow 70 into the upstream chamber 78.

The upstream chamber valve 84 can be any device operable to be pivoted, rotated, translated or actuated in any way to modulate the flow of air into the upstream chamber 78. To set forth just a few non-limiting examples, the upstream chamber valve 84 can be translated fore and aft in one form, or can be rotated like a screw in another. In some embodiments, the upstream chamber valve 84 can be formed as a sleeve. Some embodiments of the upstream chamber valve 84 can be a single unitary piece, while in other forms the inlet valve 60 can be segmented and/or assembled as a whole. In some embodiments a position of the upstream chamber valve 84 can be varied as a result of commands issued by the controller 56 as a result of a flight condition, among possible other conditions/events/modes. Furthermore, the upstream chamber valve 84 can be actuated by a single actuation device (not shown), or a plurality of actuation devices. The actuation devices can be electric, hydraulic, and/or pneumatic, to set forth just a few non-limiting examples.

The downstream chamber 82 receives the combustion flow stream from the gas turbine engine 62, and can alternatively and/or additionally receive at least part of the bypass flow 70. The downstream chamber 82 can also receive a fuel/air mixture that includes the bypass flow 70 after a fuel is delivered with the fuel injector 80. The downstream chamber 82 can include a downstream chamber valve 86 that may admit at least part of the bypass flow 70 into the downstream chamber 82. The downstream chamber valve 86 can be any suitable valve. In some forms the downstream chamber valve 86 can include any variety of forms as discussed above regarding the upstream chamber valve 84. The downstream chamber valve 86, however, need not take the same form as the upstream chamber valve 84 in any given embodiment. In some forms the upstream chamber valve 84 can be integrated with the downstream chamber valve 86, while in other forms the valves are physically separate.

The fuel injector 80 can be any suitable mechanism that delivers fuel to the aircraft engine 50 and can be capable of delivering fuel at a variety of flow rates. Any variety of fuel can be used such as a hydrocarbon fuel or hydrogen. In some embodiments, the fuel injector 80 can take the form of a fuel nozzle. The fuel injector 80 can be coupled with a strut or other structure that extends partially or fully across a flow path of the aircraft engine 50. If present in some embodiments the strut can have an airfoil shape. The fuel injector 80 can be operated to deliver fuel into the aircraft engine 50 during flight conditions at or below the speed of sound as well as above the speed of sound. In one form the fuel injector 80 can form part of an afterburner for the gas turbine engine 62. The fuel injector 80 can have other uses which may or may not be coupled with a distinct operating mode, such as delivering fuel for a combustion process associated with a ramburner cycle or ramjet cycle, to set forth just a few non-limiting examples.

Figure 2:
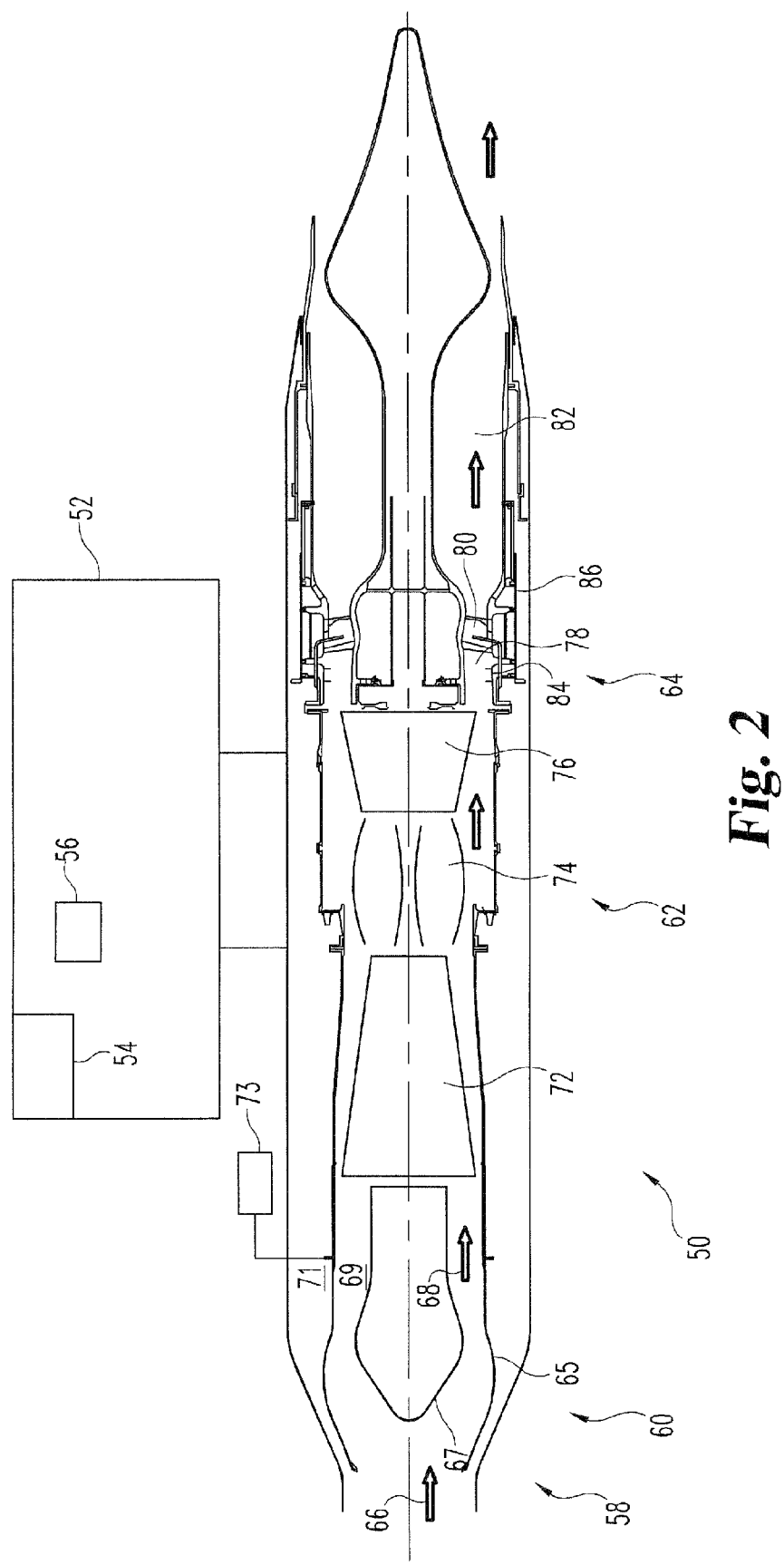
FIG. 2 illustrates an embodiment operated as a gas turbine engine.

The aircraft engine 50 can be operated in at least three distinct modes/cycles that can be associated with a particular flight condition. At relatively slow speeds the aircraft engine 50 can be operated as a gas turbine engine powerplant, an example of which is illustrated in FIG. 2. In one such form the inlet valve 60 can be positioned to permit the core flow 68 to enter the gas turbine engine 62. The inlet valve 60 can be positioned to permit a small amount of bypass flow 70 during operation of the gas turbine engine 62 or can be positioned to engage with other structure to shut off such a flow.

Figure 3:
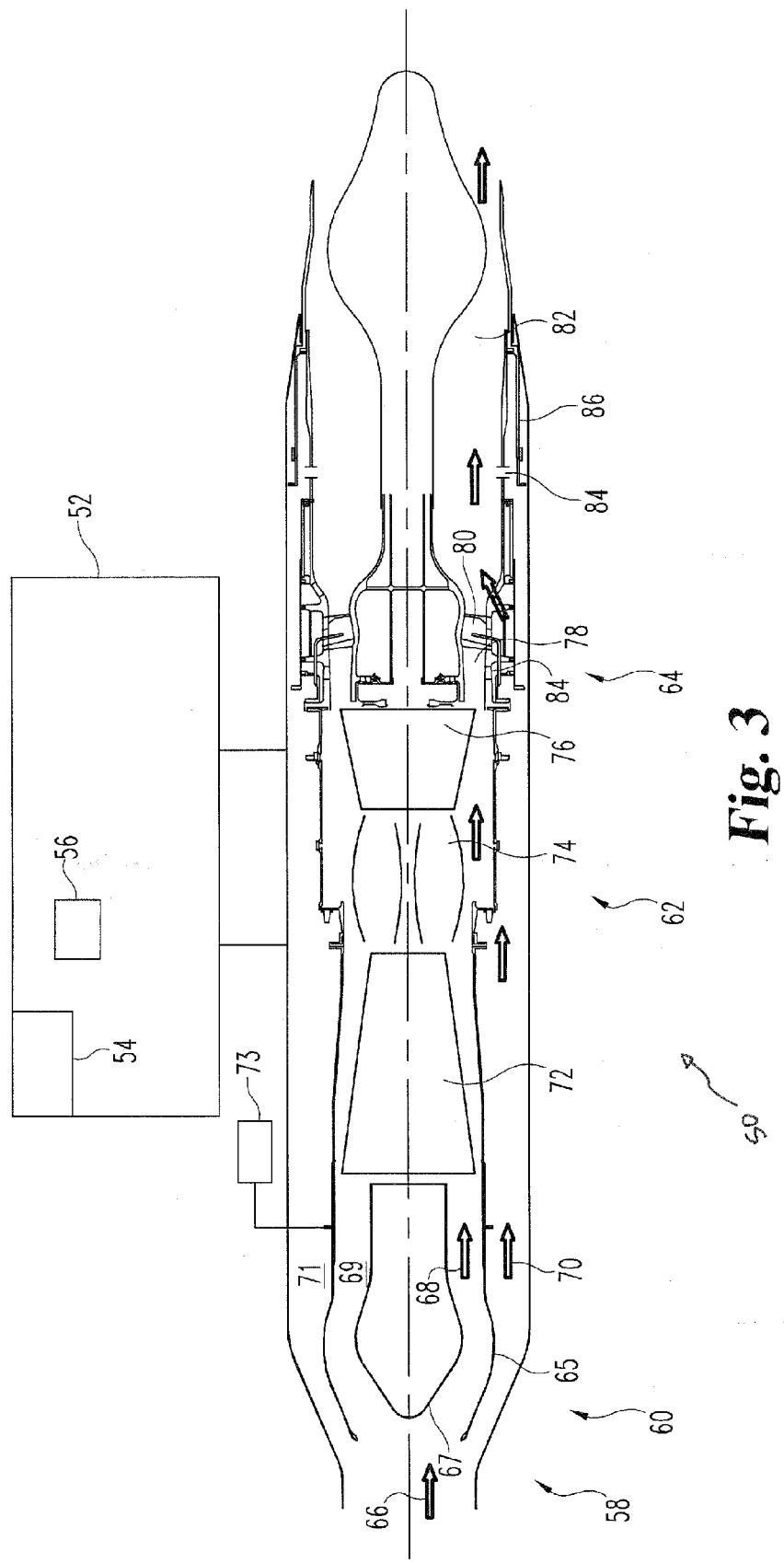
FIG. 3 illustrates an embodiment operated as a ramburner and/or scramburner.

The aircraft engine 50 can also be operated such that the combustion device functions as a ramburner. One form of such a mode is depicted in FIG. 3. An exhaust stream exiting produced by the core combustor 74 and passing through the turbine 76 in the illustrative embodiment enters the combustion device 64. Fuel is injected into the combustion device 64 and is mixed with the exhaust stream and burned to create a ramburner combustion process. In some embodiments the ramburner can take the form of a supersonic compression ramburner, or scramburner. While the illustrative embodiment depicts the ramburner located axially aft of the gas turbine engine 62, some forms of the aircraft engine 50 may locate the ramburner in the bypass duct of the aircraft engine. In the illustrative embodiment the bypass flow 70 is taken from a mass flow captured by the vehicle inlet. In other embodiments, however, the bypass flow 70 can originate from other than the vehicle inlet 63. To set forth just one non-limiting example, in some embodiments the bypass flow 70 can originate from a separate inlet dedicated to providing air flow to the ramburner. Other sources of the bypass flow 70 are also contemplated herein. The bypass flow 70 provides additional oxygen to the ramburner combustion process and can also be used to cool down the vitiated combusted gases so that ramburner outlet temperatures are maintained within material capability limits. Some embodiments of the ramburner, however, may not maintain temperatures within material capability limits during some portions of operation.

In one form of operation, the ramburner may include no mechanical form of flame stabilizers; instead, a combustion flame may be stabilized by an auto ignition reaction created inside the ramburner. In one form the through flow velocity of the ramburner exceeds a turbulent flame speed of conventional augmenters and combustors. Therefore, to operate without mechanical flame holders and achieve auto ignition, the ramburner operates at high turbine exit temperatures to ensure an operable ignition delay time. In one form the ignition delay time is within 1 millisecond from a fuel injection point. By operating without mechanical flame holders, the ramburner may offer additional thrust capability to an air breathing gas turbine engine without a cycle penalty due to pressure loss such as might be present in conventional augmenter designs having mechanical flame holder features.

Figure 4:
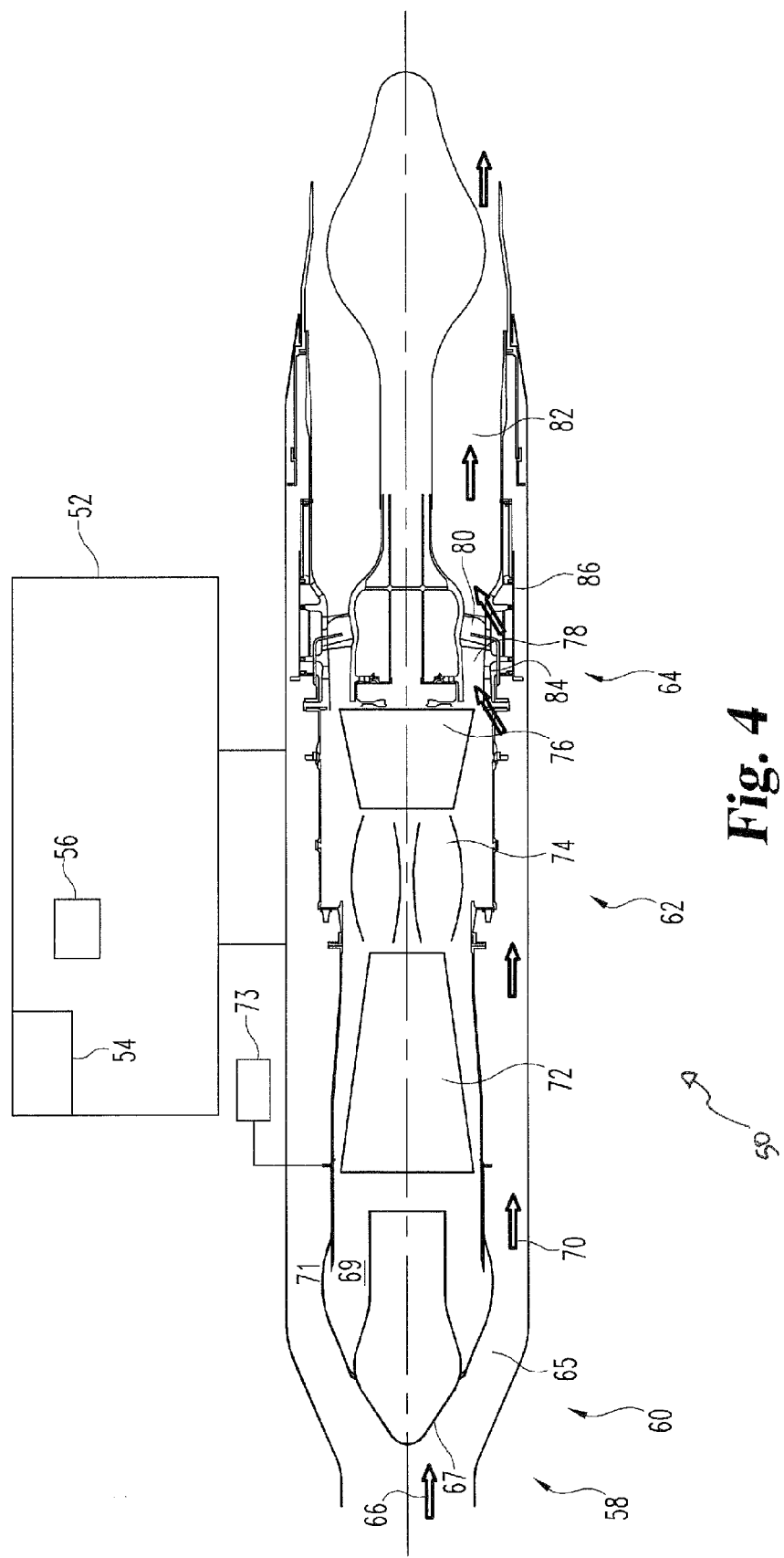
FIG. 4 illustrates an embodiment operated as a forward compression speed combustor.

In yet another form, the aircraft engine 50 may be operated as a forward speed compression combustor such as a ramjet or scramjet. This mode of operation can be seen illustrated in FIG. 4. In such a mode the inlet valve 60 can be positioned to cocoon the gas turbine engine 62 by substantially reducing or cutting off the core flow 68. While the illustrative embodiment depicts the forward speed compression combustor located axially aft of the gas turbine engine 62, some forms of the aircraft engine 50 may locate the forward speed compression combustor in the bypass duct of the aircraft engine.

One aspect of the present application provides an apparatus comprising a propulsion engine having an inlet operable to convey a working fluid for combustion and a bypass valve operable to selectively bypass a quantity of the working fluid, the propulsion engine having three thrust producing modes including a first thrust producing mode including a gas turbine engine having a rotating compressor, a core combustor, and a rotating turbine, wherein the bypass valve is operated to provide air flow to the gas turbine engine, a second thrust producing mode including an auto-ignition combustor operable to support an auto-ignition process, wherein the bypass valve provides an airflow to the auto-ignition combustor, a third thrust producing mode including a combustion chamber and excluding a rotating compressor of the propulsion engine, wherein at least a portion of a compression of an air flow into the combustion chamber is provided by a speed of an inlet airflow of the propulsion engine, and wherein the bypass valve is operable to be positioned to cocoon the gas turbine engine during high temperature conditions.

Another aspect of the present application provides an apparatus comprising an aircraft engine operable to provide power below and above sonic aircraft speeds, the aircraft engine including a gas turbine engine core and a ramburner, the gas turbine engine core including a core combustor, a gas turbine engine inlet valve operable to provide a first airflow and a second airflow, the first airflow routed to the gas turbine engine core, the second airflow routed to the ramburner.

Still another aspect of the present application provides an apparatus comprising an aircraft powerplant having a gas turbine engine combustor, a ramburner combustor, and a forward flight compression combustor, the aircraft powerplant having a core flow path and a bypass flowpath, wherein the core flow path provides air to the gas turbine engine, and the bypass flow path provides air to the forward flight compression combustor, and means for directing airflow through the core flow path and the bypass flow path, the means operable to provide airflow when the gas turbine engine is operating with the ramburner, and the means operable to provide airflow to the forward flight compression combustor in the absence of an operation of the gas turbine engine.

Yet still another aspect of the present application provides a method comprising: capturing an aircraft engine inlet flow stream to be used in a combustion process generating propulsive force for an aircraft, flowing at least a portion of the engine inlet flow stream to a ramburner combustor, and moving a valve to substantially reduce the portion of the engine inlet flow stream to the ramburner and provide a portion of the inlet flow stream to a forward speed compression combustor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a propulsion engine having an inlet operable to convey a working fluid for combustion and a bypass valve operable to selectively bypass a quantity of the working fluid, the propulsion engine having three thrust producing modes including:
   a first thrust producing mode including a gas turbine engine having a rotating compressor, a core combustor, and a rotating turbine, wherein the bypass valve is operated to provide air flow to the gas turbine engine by positioning a leading edge of the bypass valve upstream of a forward end of an engine centerbody, wherein the forward end is forward of the compressor;
   a second thrust producing mode including an auto-ignition combustor operable to support an auto-ignition process, wherein the bypass valve provides an airflow to the auto-ignition combustor;
   a third thrust producing mode including a combustion chamber and excluding a rotating compressor of the propulsion engine, wherein at least a portion of a compression of an air flow into the combustion chamber is provided by a speed of an inlet airflow of the propulsion engine; and
   wherein the bypass valve is operable to be positioned to cocoon the gas turbine engine.

2. The apparatus of claim 1 wherein the bypass valve is an annular sleeve operable to be engaged with a structure, the engagement of the annular sleeve and the structure operable to discourage the passage of air flow.

3. The apparatus of claim 2 wherein the annular sleeve is operable to engage a centerbody by translating axially along the propulsion engine.

4. The apparatus of claim 3 wherein the annular sleeve includes an axially forward portion, wherein the centerbody includes a maximal portion, and where the axially forward portion engages the maximal portion.

5. The apparatus of claim 2 which further includes a combustor valve operable to admit air to the auto-ignition combustor, wherein the combustor valve admits air during the second mode.

6. The apparatus of claim 1 which further includes a combustion device having the auto-ignition combustor and the combustion chamber, the combustion device located downstream of the gas turbine engine and including a combustion device inlet operable to receive an exhaust flow from the gas turbine engine.

7. The apparatus of claim 1 wherein the bypass valve cocoons the gas turbine engine during the third thrust producing mode, the bypass valve operable to protect the gas turbine engine from relatively high temperature flow conditions.

8. An apparatus comprising:
   an aircraft engine operable to provide power below and above sonic aircraft speeds, the aircraft engine including a gas turbine engine core and a ramburner, the gas turbine engine core including a core combustor; and
   a gas turbine engine inlet valve operable to provide a first airflow and a second airflow, the first airflow routed to the gas turbine engine core, the second airflow routed to the ramburner, the first airflow formed by positioning a leading edge of the gas turbine engine inlet valve axially forward of an apex of an engine centerbody, wherein the apex is positioned forward of a compressor, wherein an annular flow space is formed between the gas turbine engine inlet valve and the centerbody;
   wherein the ramburner is structured to receive products of combustion from the core combustor and to receive the second airflow provided by the gas turbine engine inlet valve.

9. The apparatus of claim 8 which further includes a non-core combustor operable to receive a flow stream diverted away from the gas turbine engine core and which is compressed by the forward speed of an aircraft.

10. The apparatus of claim 9 wherein the gas turbine inlet valve is a sleeve capable of being moved between a first position and a second position.

11. The apparatus of claim 10, wherein the sleeve is moved by translation.

12. The apparatus of claim 10 which further includes a centerline body, the gas turbine inlet valve operable to engage the centerline body to substantially close off a flow path to the gas turbine engine core.

13. The apparatus of claim 8 which further includes a non-core combustor valve, the non-core combustor valve operable to admit the second airflow to the non-core combustor.

14. The apparatus of claim 8 which further includes an aircraft and a FADEC, the FADEC operable to transition the aircraft engine from a first flight condition to the second flight condition.

* * * * *